Dec. 13, 1938.  W. H. MASON  2,140,189
MOMENTARY-PRESSURE PROCESS OF MAKING LIGNO-CELLULOSE PRODUCTS
Filed Oct. 9, 1936
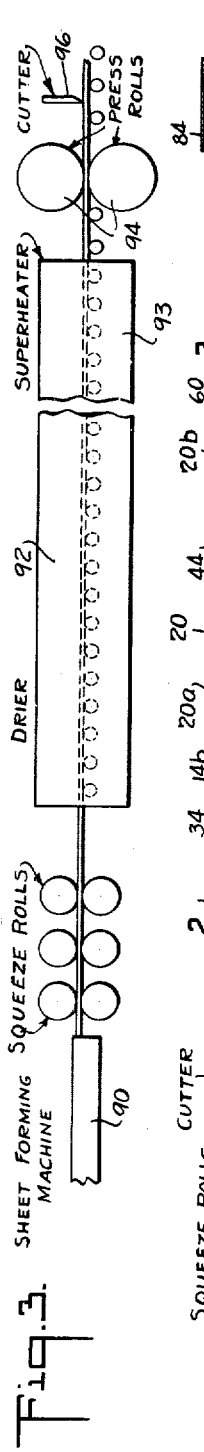
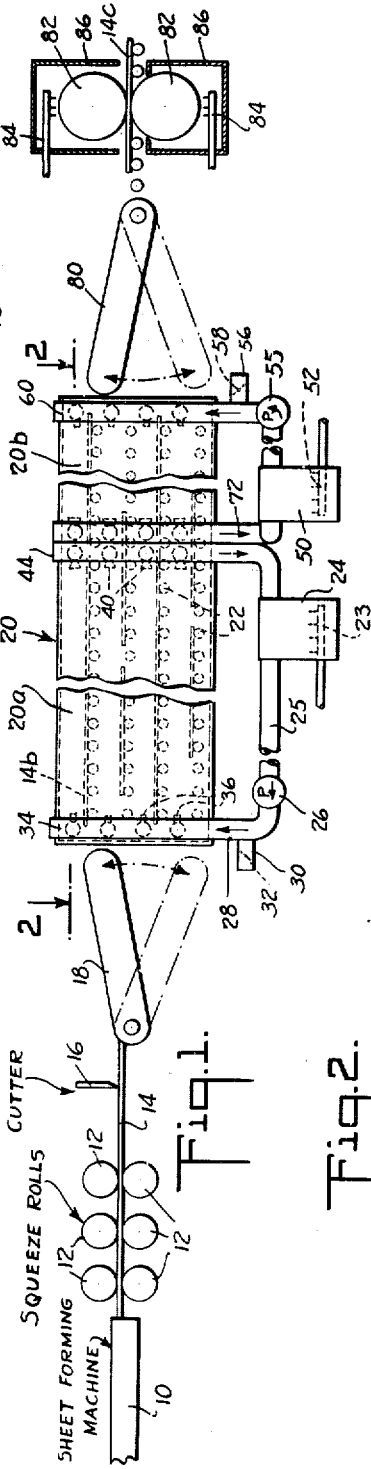
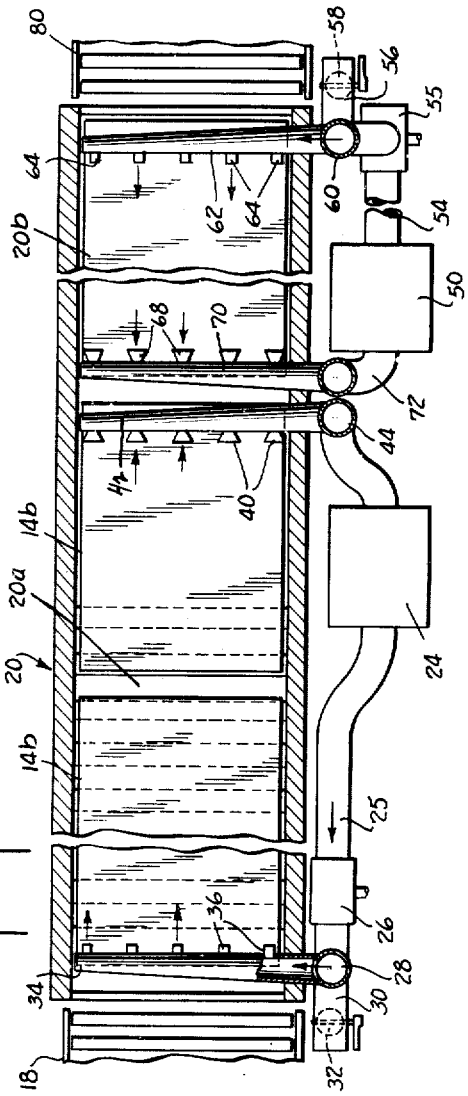
INVENTOR
William H. Mason
BY
Dyke + Schainer
ATTORNEYS

UNITED STATES PATENT OFFICE 2,140,189

MOMENTARY-PRESSURE PROCESS OF MAKING LIGNO-CELLULOSE PRODUCTS

William H. Mason, Laurel, Miss., assignor to Masonite Corporation, Laurel, Miss., a corporation of Delaware Application October 9, 1936, Serial No. 104,780

14 Claims. (Cl. 92—39)

My invention relates to a momentary-pressure process of making ligno-cellulose products, and particularly to a process of producing dense, stiff, strong, water-resistant products of ligno-cellulose material with substantially momentary application of consolidating pressure.

One object of the invention is to provide a process of treating ligno-cellulose material in such a way that permanent consolidation thereof can be effected by substantially momentary application of pressure, applied, for example, by means of press rolls turning at a relatively high rate of speed.

A further object is the provision of a process whereby ligno-cellulose material can be put into a state for conversion, and converted substantially momentarily by application of sufficient pressure, into a permanently dense product, which is of about 1 to 1.25 sp. gr., which when sized with 2% of paraffin will not absorb to exceed 15% of water upon 24 hours soaking, which is of such stiffness that the modulus of elasticity dry is over 900,000 lbs. per sq. in., and which is of such strength that the modulus of rupture dry is over 6000 lbs. per square inch, and after 24 hours soaking in water, the modulus of rupture wet is 60% of the dry modulus or higher.

A further object is to provide a process for producing sheet products of ligno-cellulose material, having characteristics as above stated, rapidly and at low cost.

A further object is to provide a process for producing sheets which can be smooth or of any desired surface conformation on both surfaces.

A further object is the provision of a hardboard sheet product of ligno-cellulose material which has been predominantly converted to plastic state by heat treatment, and dried completely dry.

Further objects will appear from the following description of illustrative embodiments of my invention.

In order to put the ligno-cellulose material into such state that it can be permanently consolidated substantially momentarily by means of press rolls or other means for making substantially momentary application of sufficient pressure, it is first transformed to a predominate extent into substantially plastic state by means of high temperature heat treatment applied for a time suited to the temperature used, and to the particular source of ligno-cellulose material.

The heat-treated material, preferably after being subdivided and reformed into desired formation, as sheet formation, for example, is dried and the dry material superheated, and when in the dry superheated and predominantly plastic state it can be permanently consolidated practically momentarily.

The heat treatment is preferably carried out by means of steam. When the ligno-cellulose material made use of is wood which is preferable, the wood is desirably air-dried down to a substantially uniform water content, as for instance about 30% of water content. Avoidance of presence of water in undue quantities in this or other ways is of advantage in securing uniform control of the time for heat treatment by means of the high temperature steam. In order that all parts of the ligno-cellulose material may be heat-treated substantially alike, the wood is preferably reduced to small chips preparatory to the heat treatment, as for instance chips which pass through a one-inch screen.

Ligno-cellulose materials which has been heat-treated by means of stem at 350 lbs. pressure per sq. in. (225° C.) for too long a time, as an extreme example, for over an hour is largely devoid of material in fibrous-appearing state and not well adapted for being readily dewatered and felted into sheets, whereas with a much shorter time, preferably about 5 minutes, at this pressure and temperature, a predominantly plastic ligno-cellulose material is obtained which is free from these objections. As the pressure and temperature are increased, however, the time at the maximum pressure (after an initial period of pressure rise) can be decreased and relatively more of the fibrous-appearing ligno-cellulose material obtained. For example, at 600 lbs. per sq. in. (255° C.), the time at full pressure for heat treatment of hardwood, such as gum, can be approximately 45 seconds, and for soft wood, such as pine, can be approximately 60 seconds; and at 1000 lbs. per sq. in. (285° C.), it can be approximately 10 seconds for gum to 15 seconds for pine. The time and/or temperature is somewhat less for woody growths, such as corn stalks, cane bagasse, etc., which can be used if desired.

The heat-treated ligno-cellulose material is reduced to a state of relatively fine subdivision, permitting reforming into desired shapes, as for example into sheets. The subdivision may be accomplished in various ways, but is preferably accomplished by carrying on the heat treatment in a closed container or gun such as described in my Patent No. 1,824,221, and, when the heat treatment has been carried on for the predetermined period of time, a small outlet is opened whereby the heat-treated material is explosively discharged into a state of relative fineness, and the heat treatment is terminated. The heat treatment may be carried out in other ways, as in an autoclave, and in such case the heat treatment may be terminated, after a suitable number of seconds have elapsed, as by flooding with water, and the material may be reduced to fineness by means of a rodmill or the like after the autoclave is emptied.

It is to be noted that in making predominate conversion of the ligno-cellulose material into plastic state as herein described, the time in the gun at full pressure is considerably longer than heretofore required for making relatively coarse fiber for manufacture of fiber boards, such as the "Presdwood" heretofore manufactured by Masonite Corporation, for example.

In order to secure the desired predominate conversion to plastic state, the fibrous ligno-cellulose wood or woody starting material should contain a sufficient portion of the fiber encrusting substances containing lignin. Cellulose fiber made by chemical digestion, such as soda pulp, for example, from which the non-cellulose constituents have been removed, is not adatped for the purposes of the invention. Preferably the material taken for treatment is raw wood with the natural encrustants retained, which is the most readily available source of the fibrous ligno-cellulose substance, and contains (together with the cellulose) the lignin and other natural non-cellulose, i. e., constituents other than cellulose.

The transformation of the ligno-cellulose material into predominantly plastic state by relatively prolonged heat treatment, and subdividing to fineness, is not claimed herein except in combination with other steps, same being claimed per se in a joint Patent No. 2,080,078, granted to Mason, Boehm and Koonce on May 11, 1937, upon application, Serial No. 3,640, filed January 26, 1935, and copending herewith. Said patent also discloses making paper of such predominantly plastic material and such making of paper is not claimed herein.

I have discovered that if the ligno-cellulose material, which has been rendered predominantly plastic by high temperature heat treatment, is dried completely dry, and further heated or superheated, such dry, hot material can be permanently consolidated to a density of about 1–1.25 specific gravity by application of sufficient pressure thereto, even though the pressure be very quickly applied and released substantially immediately.

While I preferably apply these novel steps to a relatively thick sheet made from a wetlap, such as a wetlap 3/8"–1/2" thick, for example, I may apply said steps of drying dry, superheating, and momentary permanent densifying, to a sheet or a plurality of superposed sheets of relatively thin paper formed by ordinary paper-making procedure from the ligno-cellulose material which has been rendered predominantly plastic by heat treatment.

When using times for heat treatment of the ligno-cellulose material as above described, especially from about 225° C. to about 285° C., the ligno-cellulose material as discharged from the gun appears to largely retain its fibrous structure. Therewith is a lesser amount of substantially powder of dust-like material. Both these parts, however, are predominantly plastic and exhibit this characteristic when the material is put through the various steps of this invention.

The fibrous material present is of advantage in that it enables the material to be dewatered and felted into sheet form for making wetlap sheets. Any coarse fiber present may be screened out, and the material can be lightly beaten in water, without much refinement, to a generally uniform consistency by means of a "Jordan" or the like apparatus.

The heat-treated material usually contains about 20% or more of water solubles which are removed or substantially reduced, preferably reduced to about 5% by washing in water, thereby making the final product more water-resisting. Other losses take place, as approximately 20% loss in the heat treatment and subdivision to fineness, and some loss during the superheating operation after drying referred to below, so that losses up to about 40% on the dry weight of the original chips may be encountered in getting the final product. However, the materials used are so cheap that these losses are relatively unimportant in view of the valuable product produced and the low expense involved in the manufacturing operations.

Sizing materials may be incorporated for further enhancing the naturally high water resistance, as for example 2% of petrolatum or paraffin sizing is useful for this purpose.

For making sheet products, the heat-treated and finely divided, and preferably sized, material is preferably formed from water into wetlap sheet formation, and excess water removed as by passing through squeeze rolls, and the sheet is dried completely dry. The drying (and superheating in dry state referred to below) is preferably effected by means of heated gases, preferably air with the oxygen largely replaced by products of combustion, in order to reduce likelihood of burning at the high temperatures made use of. If the operation is interrupted at this point and the sheets stored temporarily before proceeding with further treatment described below, the sheets will absorb moisture. This moisture should be dried out before proceeding with the further treatment.

It may be noted that the dried sheet, which is usually of about .7 sp. gr., can be taken for use as a wall board if desired, instead of being put through the further treatment as hereinafter described.

After the ligno-cellulose material is dry, it is further heated to over 150° C. and preferably to over 180° C. Constituents which are converted into gaseous form at such temperature, and might produce blisters during later application of pressure, can be eliminated during such superheating operation. The sheet after being so dried and superheated can be consolidated by immediate application of sufficent pressure, and the consolidation so effected is permanent, even though the pressure be very quickly applied and released substantially immediately.

While such pressure application may be made in various ways, the most convenient mode consists in passing the sheet through between a pair of press rolls forced toward one another at high pressure, as by means of hydraulic rams.

The rolls are not primarily relied upon to supply heat to the sheet since the sheet when delivered to the rolls is at high temperature as above described.

However, the rolls are preferably heated to a temperature which may somewhat exceed the temperature of the sheets being rolled. In this way the rolls of steel or the like serve to prevent the sheet from cooling during the rolling operation, and impart additional heat at the surface, giving improved surface qualities.

When making sheets from relatively thick wet-laps, the rolls are preferably smooth cylindrical rolls, thus making a sheet which is smooth on both surfaces. If desired, one or both of the roll surfaces may contain patterns which will appear upon the sheet after rolling.

The roll speed can be varied throughout a fairly wide range, as indicated in the examples given below. When the rolls are heated to or materially above the temperature at which the sheet is delivered to the rolls, low roll speeds, as for example roll speed below about 2 feet per minute, should be avoided because the additional heat delivery to the sheet from the slowly turning rolls tends to produce formation of gases and resulting blisters in the product sheet.

As an illustrative example, gum wood was air dried to about 30% water content and hogged into chips. The chips were screened, and those passing through a one-inch screen taken for use.

A gun was charged with chips and closed.

Steam was admitted and the pressure raised to 600 lbs. per sq. in. (225° C.) and held at this pressure for 45 seconds.

A small outlet was opened and the contents of the gun explosively discharged through the opening.

With the heat-treatment and disintegration regulated in this way, the resulting relatively finely divided material was largely fibrous in appearance, with a small portion of dust or powder-like material substantially without fibrous structure. Its weight (dry basis) was about 20% less than that of the chips, a portion of the wood apparently having been converted into gases. It was screened and the little relatively coarse fiber present discarded.

The subdivided ligno-cellulose material was put into water and lightly beaten in a beater of the Jordan type to make a pulp containing about 95% water. It was found that the exploded ligno-cellulose material contained about 20% of water soluble materials, and the water soluble content was reduced to about 5% by being dissolved out by the water.

The water and fiber mixture was heated above the melting point of paraffin, and molten paraffin added in an amount about equal to 2% of dry ligno-cellulose material by weight, and the paraffin was taken up by the ligno-cellulose material.

The resulting ligno-cellulose material, representing about 60% of the weight of the chips, was felted into sheet form from the water. The stock was somewhat "slow" due to its fineness and the dust or powder material present, but sufficient fibrous material was present to permit egress of water and to form felted sheets.

Water was pressed out of the sheet, bringing the water content down to about 50% (100% on weight of the dry ligno-cellulose material).

The resulting sheets, which were about ⅜" to ½" thick, were dried until completely dry as indicated by the fact that there was no further loss of weight, and were further heated for several minutes with indications of evolution of gaseous material. During the drying and further heating the sheets had shrunk to less than ¼ inch in thickness and were of about .7 sp. gr., and as already stated, could be used for wall boards if desired.

These sheets were converted into the board product about ⅛" thick by passing same in dry, hot state immediately between hot pressure rolls. Thickness of the product may be varied as desired, as by making thinner or thicker wetlap.

The following table gives representative conditions and the results obtained:

| | | | | | |
|---|---|---|---|---|---|
| Roll speed per min. in inches | 70" | 150" | 150" | 200" | 300" |
| Roll diameter in inches | 36" | 36" | 36" | 36" | 36" |
| Roll pressure—lbs. per linear inch | 3260 | 4500 | 3800 | 4500 | 3800 |
| Roll temperature (C.) | 270° | 225° | 270° | 270° | 270° |
| Sheet drying and superheating time | 25 min. | 17 min. | 23 min. | 23 min. | 24 min. |
| Temperature (C.) of superheated sheets | 200° | 225° | 200° | 200° | 200° |
| Specific gravity of product | 1.20 | 1.22 | 1.16 | 1.16 | 1.14 |
| Modulus of rupture dry—lbs. per sq. in | 8300 | 6965 | 6500 | 7090 | 7365 |
| Modulus of elasticity—lbs. per sq. in | 1,022,000 | 1,101,000 | 910,000 | 962,000 | 922,500 |
| Water absorption in 24 hours | 6.3% | 6.1% | 8.1% | 9.3% | 7.2% |
| Residual strength (ratio of modulus of rupture after 24 hrs. soaking in water to modulus of rupture dry) | ---------- | 88.8% | 72.8% | ---------- | 61.4% |

In the accompanying drawing, Fig. 1 is a diagrammatical side view, and Fig. 2 a diagrammatical section on line 2—2 of Fig. 1 of apparatus (with exception of that for heat-treating and subdividing) for carrying out the new process continually; and Fig. 3 is a diagrammatical side view of corresponding apparatus for continuous operation.

Referring to Figs. 1 and 2, reference character 10 indicates a continuous sheet-forming machine, which may be of any suitable type, as a Fourdrinier or Oliver, or as shown in my Patent No. 1,875,075. Squeeze rolls 12, 12 are provided for pressing out water from the sheet 14 delivered continuously by the sheet forming machine 10. One or more vacuum rolls (not shown) may be used if desired, and the sheet may move along on a travelling screen (not shown).

The cut-off 16, which may be constructed as shown in my Patent No. 1,924,162, serves to cut the continuously formed wet-lap 14 into desired lengths 14b when desired, as for example when using a multiple-deck apparatus for drying and superheating the sheets.

Entrance tipple 18 serves to deliver the sheets 14b to the several decks of the drier and superheater apparatus, which is indicated generally by the reference character 20.

Such apparatus 20 is multiple decked, being shown with four decks provided by means of the four sets of driven rolls 22, 22.

In the form shown diagrammatically, the apparatus 20 for supplying heat to the sheets is divided into two parts, the drier portion 20a and the superheater portion 20b, and two circulatory systems for hot gases are illustrated—one for the drier potrion 20a and the other for superheater portion 20b for superheating the previously dried sheets.

When using gas as fuel, a combustible mixture of gas and air is supplied for the heater section 20a by burner 23. The combustion chamber 24 containing burner 23 is included in a circulatory system comprising conduit part 25, blower 26, conduit part 28 equipped with a side vent 30 having a regulable damper 32, cross ducts 34 tapered to give even flow through the spaced outlet spouts 36 located at or near the entrance end of the drier section 20a, through drier section 20a, and back to the combustion chamber 24 through preferably taper inlet spouts 40, cross ducts 42, tapered similarly to ducts 36, and conduit part 44. Damper 32 is adjusted or controlled to allow escape of gases as other gases are added to the closed circulatory system, such as fuel gas with accompanying air for combustion and steam and gases from the sheets of ligno-cellulose material. With such arrangement the heating gases consist principally of air in which the oxygen is replaced by relatively inert products of combustion. The hottest gases preferably encounter the entering sheets 14b containing the maximum water percentage, as indicated in the drawing.

While one such hot gas circulating system could be used, I prefer two as shown, one for drying the sheets, and the other for superheating the dried sheets. The sheets are ordinarily completely dried in chamber 20a, and chamber 20b is devoted to further heating or superheating of the previously dried sheets. The substantially separate circulatory system for superheater section 20b may include a combustion chamber 50 with gas burners 52, conduit part 54, blower 55, side vent 56 with damper 58, conduit part 60, cross ducts 62, outlet spouts 64, heating chamber 20b through which the dried sheets travel on their rolls 22, inlet spouts 68, cross ducts 70, and conduit part 72 leading back to combustion chamber 50. In this superheater section 20b the circulation arrangement is preferably the reverse of that for the drying section 20a, the gases travelling counter to sheet travel, with the hottest gases encountering the sheets as they are finally discharged from the sheet superheater in order that the sheets shall be not only dry but also superheated when delivered to the pressure rolls. Superheating with gases deficient in oxygen as above described enables higher temperature to be used with decreased danger of burning as compared with normal atmospheric air.

An exit tipple 80 is arranged to deliver the sheets from any of the several decks of the sheet drier and superheater to the pressure rolls 82, and is preferably floored with power driven rollers to ensure quick delivery of the hot sheets to the pressure rolls. This tipple 80 may be jacketed if desired to keep the sheets thereon hot and surrounded with gases deficient in oxygen. Rolls 82 may be heated as by gas jets 84, and the heated gases confined to some extent, as by means of hoods 86. The sheet product is indicated at 14c.

A desirable mode of operation is to arrange for exit of a dry, hot sheet 14b at the exit end of the superheating chamber 20b at the same time that a new moist, cool sheet is inserted at the entrance end of the drier part 20a of the same deck. If the drier is short, the sheets may be moved along at relatively slow speed in the intermediate drier space.

Cutting the continuously formed sheet into pieces for individual handling in the drier-superheater and in the rolls is of advantage in permitting practically individual control and speed regulation of the several devices including sheet-forming machine, drier-superheater, and press rolls, but these may all be operated in synchronism and the operations carried out on the continuous sheet, which in such case is not cut into separate lengths until it has passed through the pair of press rolls.

Such arrangement is indicated diagrammatically in Fig. 3, in which 90 is the sheet-forming machine, 92 a long continuous drier, 93 a superheater, 94 the pressure rolls, and 96 the cut-off. Some shrinkage takes place in the drier and some elongation in passage through the pressure rolls, and these may be compensated for in any desired way, as by means of a differential drive (not shown) for the pressure rolls. The cutting may be done after passing through the superheater, if desired.

The invention may be carried out with presses, rolls and other pressure-applying devices of various forms. For example, according to one modification of the invention I may convert sheets of the heat-treated and predominantly plastic ligno-cellulose material, preferably thin or paper-like sheets thereof, as for example sheets about .01 of an inch thick, commonly called paper board, into corrugated board suitable for carton manufacture.

One or more of the paper sheets, preferably "creped" so as to be capable of being re-extended and to thereby avoid breaking, can be superheated as described above, and passed between crimping rolls to produce lines of corrugation, which preferably extend transversely of the sheet. The crimping rolls are preferably heated as already described with respect to the thicker sheets. This mode of carrying out the invention provides a cheap and extremely stiff corrugated board adapted for strengthening of cartons and numerous other uses. When plural paper sheets are superposed and pressed in such relation, the resulting product is free from lamination and free from signs of lamination.

Still other modifications may be resorted to within the scope of the invention.

Products having the characteristic properties hereinabove described are preferably made directly from the heat-treated ligno-cellulose material alone, without incorporation of extraneous bonding or filler constituents. However, additions of binders, fillers, pigments and other materials, while unnecessary, may be made to the heat-treated ligno-cellulose material and will be embraced within the invention so long as the principles hereof are utilized.

I claim:

1. Process of making dense hardboard sheet products, which consists in the steps of subjecting fibrous wood or woody ligno-cellulose material, which contains the natural fiber incrustation, in relatively small pieces, to a heat-treatment at a temperature over 225° C. in presence of moisture at a pressure over 350 pounds per square inch and then disintegrating the material, regulating the time of heat-treatment and the extent of disintegration to convert the material into predominantly plastic state with some content of water-solubles and with part of the ligno-cellulose material substantially without fibrous structure while enough of the fibrous structure is left to enable felting the material into a wetlap sheet from water, then forming a pulp of the material with water and felting into sheet form from the water whereby the content of water-solubles is substantially reduced, then completely drying the sheet and additionally heating the dried sheet to a temperature over 150° C., and then making substantially momentary application to the sheet in its completely dry and further heated state of compacting pressure sufficient to consolidate the sheet into a dense hardboard product of about 1–1.25 specific gravity.

2. Process as in claim 1, and wherein the application of compacting pressure is made by pressure rolls.

3. Process as in claim 1, and wherein the application of compacting pressure is made by pressure rolls heated to a higher temperature than the sheet.

4. Process as in claim 1, and wherein the heat-treatment is performed with steam in a closed chamber and the ligno-cellulose material is disintegrated by explosive discharge from the steam pressure in the chamber upon opening a small outlet from said chamber.

5. Process as in claim 1, and wherein the times and temperatures for the operation designated "heat-treatment" in said claim 1 are from about 60 seconds and 255° C. to about 10 seconds and 285° C.

6. Process as in claim 1, and wherein the heat-treatment is performed with steam in a closed chamber and the ligno-cellulose material is disintegrated by explosive discharge from the steam pressure in the chamber upon opening a small outlet from said chamber, and the heat-treatment times temperatures and pressures are from about 60 seconds and 255° C. and 600 lbs. per square inch to about 10 seconds and 285° C. and 1000 lbs. per square inch.

7. Process as in claim 1, and wherein the further heating of the completely dried ligno-cellulose material is to a temperature of from approximately 180° to 225° C.

8. Process of making dense hardboard sheet products, which consists in the steps of subjecting fibrous wood or woody ligno-cellulose material, which contains the natural fiber incrustation, in relatively small pieces, to a heat-treatment at a temperature over 225° C. in presence of moisture at a pressure over 350 pounds per square inch and then disintegrating the material, regulating the time of heat-treatment and extent of disintegration to convert the material into predominantly plastic state with some content of water-solubles and with a part of the ligno-cellulose material substantially without fibrous structure while enough of the fibrous structure is left to enable felting the material into a wetlap sheet from water, then removing at least a substantial part of the water-solubles, then forming a pulp of the material with water and felting into sheet form from the water, then completely drying the sheet and additionally heating the dried sheet to a temperature of over 150° C., and then making substantially momentary application to the sheet in its completely dry and further heated state of compacting pressure sufficient to consolidate the sheet into a dense hardboard product of about 1–1.25 specific gravity.

9. Process as in claim 8, and wherein the application of compacting pressure is made by pressure rolls.

10. Process as in claim 8, and wherein the application of compacting pressure is made by pressure rolls heated to a higher temperature than the sheet.

11. Process as in claim 8, and wherein the heat-treatment is performed with steam in a closed chamber and the ligno-cellulose material is disintegrated by explosive discharge from the steam pressure in the chamber upon opening a small outlet from said chamber.

12. Process as in claim 8, and wherein the times and temperatures for the operation designated "heat-treatment" in said claim 8 are from about 60 seconds and 255° C. to about 10 seconds and 285° C.

13. Process as in claim 8, and wherein the heat-treatment is performed with steam in a closed chamber and the ligno-cellulose material is disintegrated by explosive discharge from the steam pressure in the chamber upon opening a small outlet from said chamber, and the heat-treatment times temperatures and pressure are from about 60 seconds and 255° C. and 600 lbs. per square inch to about 10 seconds and 285° C. and 1000 lbs. per square inch.

14. Process as in claim 8, and wherein the further heating of the completely dried ligno-cellulose material is to a temperature of from approximately 180° to 225° C.

WILLIAM H. MASON.

CERTIFICATE OF CORRECTION.

Patent No. 2,140,189.   December 13, 1938.

WILLIAM H. MASON.

It is hereby certified that error appears in the printed specification of the above numbered patent requiring correction as follows: Page 1, second column, line 20, for "materials" read material; and line 21, for "stem" read steam; page 2, first column, line 25, for "adatped" read adapted; line 67, for "225°" read 255°; line 71, for "of" read or; page 3, first column, line 38, for "225°" read 255°; and second column, line 65, for "potrion" read portion; and that the said Letters Patent should be read with this correction therein that the same may conform to the record of the case in the Patent Office.

Signed and sealed this 7th day of February, A.D. 1939.

Henry Van Arsdale.

(Seal)   Acting Commissioner of Patents.

2. Process as in claim 1, and wherein the application of compacting pressure is made by pressure rolls.

3. Process as in claim 1, and wherein the application of compacting pressure is made by pressure rolls heated to a higher temperature than the sheet.

4. Process as in claim 1, and wherein the heat-treatment is performed with steam in a closed chamber and the ligno-cellulose material is disintegrated by explosive discharge from the steam pressure in the chamber upon opening a small outlet from said chamber.

5. Process as in claim 1, and wherein the times and temperatures for the operation designated "heat-treatment" in said claim 1 are from about 60 seconds and 255° C. to about 10 seconds and 285° C.

6. Process as in claim 1, and wherein the heat-treatment is performed with steam in a closed chamber and the ligno-cellulose material is disintegrated by explosive discharge from the steam pressure in the chamber upon opening a small outlet from said chamber, and the heat-treatment times temperatures and pressures are from about 60 seconds and 255° C. and 600 lbs. per square inch to about 10 seconds and 285° C. and 1000 lbs. per square inch.

7. Process as in claim 1, and wherein the further heating of the completely dried ligno-cellulose material is to a temperature of from approximately 180° to 225° C.

8. Process of making dense hardboard sheet products, which consists in the steps of subjecting fibrous wood or woody ligno-cellulose material, which contains the natural fiber incrustation, in relatively small pieces, to a heat-treatment at a temperature over 225° C. in presence of moisture at a pressure over 350 pounds per square inch and then disintegrating the material, regulating the time of heat-treatment and extent of disintegration to convert the material into predominantly plastic state with some content of water-solubles and with a part of the ligno-cellulose material substantially without fibrous structure while enough of the fibrous structure is left to enable felting the material into a wetlap sheet from water, then removing at least a substantial part of the water-solubles, then forming a pulp of the material with water and felting into sheet form from the water, then completely drying the sheet and additionally heating the dried sheet to a temperature of over 150° C., and then making substantially momentary application to the sheet in its completely dry and further heated state of compacting pressure sufficient to consolidate the sheet into a dense hardboard product of about 1–1.25 specific gravity.

9. Process as in claim 8, and wherein the application of compacting pressure is made by pressure rolls.

10. Process as in claim 8, and wherein the application of compacting pressure is made by pressure rolls heated to a higher temperature than the sheet.

11. Process as in claim 8, and wherein the heat-treatment is performed with steam in a closed chamber and the ligno-cellulose material is disintegrated by explosive discharge from the steam pressure in the chamber upon opening a small outlet from said chamber.

12. Process as in claim 8, and wherein the times and temperatures for the operation designated "heat-treatment" in said claim 8 are from about 60 seconds and 255° C. to about 10 seconds and 285° C.

13. Process as in claim 8, and wherein the heat-treatment is performed with steam in a closed chamber and the ligno-cellulose material is disintegrated by explosive discharge from the steam pressure in the chamber upon opening a small outlet from said chamber, and the heat-treatment times temperatures and pressure are from about 60 seconds and 255° C. and 600 lbs. per square inch to about 10 seconds and 285° C. and 1000 lbs. per square inch.

14. Process as in claim 8, and wherein the further heating of the completely dried ligno-cellulose material is to a temperature of from approximately 180° to 225° C.

WILLIAM H. MASON.

---

CERTIFICATE OF CORRECTION.

Patent No. 2,140,189. December 13, 1938.

WILLIAM H. MASON.

It is hereby certified that error appears in the printed specification of the above numbered patent requiring correction as follows: Page 1, second column, line 20, for "materials" read material; and line 21, for "stem" read steam; page 2, first column, line 25, for "adatped" read adapted; line 67, for "225°" read 255°; line 71, for "of" read or; page 3, first column, line 38, for "225°" read 255°; and second column, line 65, for "potrion" read portion; and that the said Letters Patent should be read with this correction therein that the same may conform to the record of the case in the Patent Office.

Signed and sealed this 7th day of February, A.D. 1939.

Henry Van Arsdale.

(Seal) Acting Commissioner of Patents.